(12) United States Patent
Boardman et al.

(10) Patent No.: US 7,384,615 B2
(45) Date of Patent: *Jun. 10, 2008

(54) METHOD OIL SHALE POLLUTANT SORPTION/$NO_x$ REBURNING MULTI-POLLUTANT CONTROL

(75) Inventors: Richard D. Boardman, Idaho Falls, ID (US); Robert A. Carrington, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 438 days.

This patent is subject to a terminal disclaimer.

(21) Appl. No.: 11/004,698

(22) Filed: Dec. 2, 2004

(65) Prior Publication Data

US 2006/0120933 A1   Jun. 8, 2006

(51) Int. Cl.
*B01D 53/34* (2006.01)
*B01D 53/46* (2006.01)
*F23J 7/00* (2006.01)
*F23J 15/00* (2006.01)

(52) U.S. Cl. .................. 423/210; 423/235; 423/239.1; 423/244.01; 423/244.07; 423/240 R; 423/240 S; 431/8; 110/218; 110/342

(58) Field of Classification Search ............... 423/210, 423/235, 239.1, 244.01, 244.07, 240 R, 240 S; 431/8; 110/218, 342
See application file for complete search history.

(56) References Cited

U.S. PATENT DOCUMENTS

| | | |
|---|---|---|
| 3,900,554 A | 8/1975 | Lyon |
| 3,995,006 A | 11/1976 | Downs et al. |
| 4,151,068 A | 4/1979 | McCollum et al. |
| 4,373,454 A | 2/1983 | Pitrolo et al. |
| 4,507,269 A | 3/1985 | Dean et al. |
| 4,579,070 A * | 4/1986 | Lin et al. .................. 110/345 |
| 4,627,964 A | 12/1986 | Audeh |
| 4,854,249 A * | 8/1989 | Khinkis et al. ............. 110/342 |
| 4,940,569 A | 7/1990 | Neal et al. |

(Continued)

OTHER PUBLICATIONS

"Combustion of Municipal Solid Wastes with Oil Shale in a Circulating Fluidized Bed," Department of Energy Grant No. DE FG01 94CE15612, Jun. 6, 1996, Energy Related Inventions Program Recommendation No. 612, Inventor R.L. Clayson, NIST Evaluator H. Robb, Consultant J.E. Sinor.

McCarthy, Harry E., "Fluidized-Bed Combustion of Oil Shale," 16th Oil Shale Symposium Proceedings, Colorado School of Mined Press, Jon W. Raese, Editor, 1983.

(Continued)

*Primary Examiner*—Timothy C. Vanoy
(74) *Attorney, Agent, or Firm*—Trask Britt, P.C.

(57) ABSTRACT

A method of decreasing pollutants produced in a combustion process. The method comprises combusting coal in a combustion chamber to produce at least one pollutant selected from the group consisting of a nitrogen-containing pollutant, sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride. Oil shale particles are introduced into the combustion chamber and are combusted to produce sorbent particulates and a reductant. The at least one pollutant is contacted with at least one of the sorbent particulates and the reductant to decrease an amount of the at least one pollutant in the combustion chamber. The reductant may chemically reduce the at least one pollutant to a benign species. The sorbent particulates may adsorb or absorb the at least one pollutant. A combustion chamber that produces decreased pollutants in a combustion process is also disclosed.

17 Claims, 1 Drawing Sheet

U.S. PATENT DOCUMENTS

| | | | |
|---|---|---|---|
| 5,008,005 A * | 4/1991 | Shang | 208/407 |
| 5,139,755 A | 8/1992 | Seeker et al. | |
| 5,176,088 A | 1/1993 | Amrhein et al. | |
| 5,571,490 A * | 11/1996 | Bronicki et al. | 423/244.01 |
| 5,827,352 A | 10/1998 | Altman et al. | |
| 6,143,263 A | 11/2000 | Johnson et al. | |
| 6,712,878 B2 | 3/2004 | Chang et al. | |
| 2005/0205462 A1 | 9/2005 | Gopalakrishnan et al. | |

OTHER PUBLICATIONS

Sinor, Jerry E., "Niche Market Assessment for a Small Scale Western Oil Shale Project," Report No. DOE/MC/11076 2759, work performed under Cooperative Agreement DE-FC21-86MC11076, Jul. 1989.

U.S. Dept. of Energy, Clean Coal Technology, vol. 1, "Clean Coal Technology Programs: Program Update 2003," Dec. 2003.

U.S. Dept. of Energy, Clean Coal Technology, vol. 2, "Clean Coal Technology Programs: Completed Projects 2003," Dec. 2003.

* cited by examiner

METHOD OIL SHALE POLLUTANT SORPTION/NO$_x$ REBURNING MULTI-POLLUTANT CONTROL

GOVERNMENT RIGHTS

The United States Government has rights in the following invention pursuant to Contract No. DE-AC07-99ID13727 between the U.S. Department of Energy and Bechtel BWXT Idaho, LLC.

FIELD OF THE INVENTION

The present invention relates to decreasing pollutants produced by combustion or gasification of a fuel. More specifically, the present invention relates to using oil shale as at least one of a sorbent and a chemical reductant to decrease the pollutants.

BACKGROUND OF THE INVENTION

Coal, biomass residuals, and solid wastes, such as wood waste, municipal solid waste ("MSW"), or refuse derived fuel ("RDF"), are used as fuels to generate electrical power. However, combustion of these fuels also produces various pollutants, such as nitrogen compounds or sulfur compounds, which are believed to be involved in the formation of smog and acid rain. If the fuel includes mercury, the combustion also produces mercury compounds, which have been identified by the Environmental Protection Agency ("EPA") as a significant toxic pollutant. The pollutants include nitrogen oxide ("NO$_x$") compounds, such as nitric oxide ("NO") and nitrogen dioxide ("NO$_2$"), sulfur oxide ("SO$_x$") compounds, such as sulfur dioxide ("SO$_2$") and sulfur trioxide ("SO$_3$"), volatile elemental mercury ("Hg°") and volatile mercuric chloride ("HgCl$_2$"). Air pollutant control legislation, such as the Clean Air Act and the Clear Skies Initiative, regulates emissions of many of these pollutants and is expected to pass in the legislature and become law in United States and other countries. The EPA is currently required to promulgate a mercury emissions limit under the Maximum Achievable Control Technology ("MACT") provisions of the 1990 Clean Air Act Amendments. Therefore, many powerplants will be required to decrease emissions of these, and other, pollutants.

If the fuel contains sulfur, the sulfur is typically converted to reduced forms of sulfur, such as hydrogen sulfide ("H$_2$S"), carbonyl sulfide ("COS"), and carbon disulfide ("CS$_2$") upon gasification of fossil fuels, biomass, and waste materials. Nitrogen contained in the fuel is converted to reduced nitrogen compounds, including ammonia ("NH$_3$"), hydrogen cyanide ("HCN"), and nitrogen ("N$_2$"). Most of the mercury entering with the fuel is converted to volatile Hg° and HgCl$_2$. The combustion of fossil fuels and biomass also liberates acid gases, such as hydrochloric acid ("HCl"), sulfuric acid ("H$_2$SO$_4$"), and phosphoric acid ("H$_3$PO$_4$"). These acid gases are corrosive to equipment used in the combustion, such as a combustion device or boiler tubes in a combustor. Therefore, it is desirable to limit the formation of the acid gases or to remove the acid gases close to their point of generation in the combustion device.

Various technologies have been developed to decrease emissions from coal-fired powerplants. Limestone has been used as a sorbent for SO$_x$ pollutants, as disclosed in U.S. Pat. No. 3,995,006 to Downs et al., U.S. Pat. No. 5,176,088 to Amrhein et al. ("Amrhein"), and U.S. Pat. No. 6,143,263 to Johnson et al. This technology is known as limestone injection multiple burner ("LIMB") technology or limestone injection dry scrubbing ("LIDS") technology. The limestone is injected into a region of a furnace having a temperature of 2,000° F.-2,400° F.

Organic and amine reducing agents, such as ammonia or urea, are used to selectively reduce NO$_x$ pollutants, as disclosed in U.S. Pat. No. 3,900,554 to Lyon. This technique is known as selective noncatalytic reduction ("SNCR"). The reducing agent is injected into a furnace at a temperature of from about 975K to about 1375K so that a noncatalytic reaction selectively reduces the NO$_x$ to molecular nitrogen ("N$_2$"). The ammonia is injected into a region of the furnace having a temperature of 1,600° F.-2,000° F.

As disclosed in Amrhein, the LIMB and SCNR technologies have been combined to simultaneously removing the NO$_x$ pollutants and the SO$_x$ pollutants. The limestone is used to absorb the SO$_x$ pollutants while the ammonia is used to absorb the NO$_x$ pollutants. However, this combination technology is expensive to implement and adds increased complexity to the process.

NO$_x$ reburning has also been used to remove the NO$_x$ pollutants, as disclosed in U.S. Pat. No. 5,139,755 to Seeker et al. In NO$_x$ reburning, the coal is combusted in two stages. In the first stage, a portion of the coal is combusted with a normal amount of air (about 10% excess), producing the NO$_x$ pollutants. In the second stage, the remaining portion of the coal is combusted in a fuel-rich environment. Hydrocarbon radicals formed by combustion of the coal react with the NO$_x$ pollutants to form N$_2$. Fuel/air staging has also been used to reduce the NO$_x$ pollutants. Fuel and air are alternately injected into a combustor to provide a reducing zone where the nitrogen in the fuel is evolved, which promotes the conversion of the nitrogen to N$_2$. The air is injected at a separate location to combust the fuel volatiles and char particles. By staging or alternating the fuel and the air, the local temperature and the mixture of air and fuel are controlled to suppress the formation of the NO$_x$ pollutants. Fuel/air staging attempts to prevent NO$_x$ formation while NO$_x$ reburning promotes NO$_x$ reduction and destruction.

To absorb mercury or mercury-containing pollutants, activated carbon is used as a sorbent, as disclosed in U.S. Pat. No. 5,827,352 to Altman et al. and U.S. Pat. No. 6,712,878 to Chang et al. The activated carbon is present as a fixed or fluidized bed or is injected into the flue gas.

Oil shale is a sedimentary rock that includes an inorganic matrix of carbonate, oxide, and silicate compounds impregnated with a polymeric material called kerogen. Kerogen is an organic substance that is insoluble in petroleum solvents. When heated, the kerogen pyrolyzes to produce gas, oil, bitumen, and an organic residue. Pyrolyzing the kerogen is also known as retorting. Oil shale also includes carbonate minerals, such as calcium carbonate, and other hydrocarbon materials, such as paraffins, cycloparaffins, aliphatic and aromatic olefins, one- to eight-ring aromatics, aromatic furans, aromatic thiophenes, hydroxyl-aromatics, dihydroxy aromatics, aromatic pyrroles, and aromatic pyridines. Oil shale is typically co-located with coal and oil and is found in various regions of the western United States, such as in Utah, Colorado, and Wyoming, and in the eastern United States, such as in Virginia and Pennsylvania. Large deposits of oil shale are also found in Canada, Europe, Russia, China, Venezuela, and Morocco. Given the abundance of oil shale throughout the world, its value would be significant if beneficial uses are identified and employed. Oil shale utilization has not been presently appreciated due to the high cost of recovering the kerogen from the shale.

When oil shale containing considerable amounts of calcium carbonate is burned in a direct combustion process, the calcium carbonate undergoes calcination, which is an endothermic reaction in which the calcium carbonate is converted to lime. For each kilogram of calcium carbonate that is calcined, as much as 1.4 MJ to 1.6 MJ (or about 600 British Thermal Units ("BTU") to 700 BTU per pound mass) of the available heat energy is consumed. This loss of energy translates to a process efficiency penalty when limestone or dolomite is used as an injected sorbent. In the case of oil shale, the kerogen can be oxidized to offset the heat sink associated with carbonate calcination.

To extract energy from the oil shale, the oil shale is heated in a retorting zone of a fluidized bed combustor to a temperature sufficient to release, but not combust, volatile hydrocarbons from the oil shale, as disclosed in U.S. Pat. No. 4,373,454 to Pitrolo et al. The temperature used in the retorting zone provides minimal calcination of the calcium carbonate. The volatile hydrocarbons flow to a combustion zone of the fluidized bed combustor, where the volatile hydrocarbons are combined with excess air and are combusted. Calcination of the calcium carbonate occurs in the combustion zone. During retorting, nitrogen compounds in the oil shale are converted to $NO_x$ compounds and are reduced to nitrogen and water or oxygen by the volatile hydrocarbons.

Oil shale has been used to absorb $SO_2$ and HCl in a circulating fluidized bed, as disclosed in "Combustion of Municipal Solid Wastes with Oil Shale in a Circulating Fluidized Bed," Department of Energy Grant No. DE-FG01-94CE15612, Jun. 6, 1996, Energy-Related Inventions Program Recommendation Number 612, Inventor R. L. Clayson, NIST Evaluator H. Robb, Consultant J. E. Sinor and in "Niche Market Assessment for a Small-Scale Western Oil Shale Project," J. E. Sinor, Report No. DOE/MC/11076-2759.

BRIEF SUMMARY OF THE INVENTION

The present invention relates to a method of decreasing pollutants produced in a combustion, gasification, or stream reforming process, which is collectively referred to herein as a "combustion" process. The term "combustion" encompasses equivalent derivate nouns, adjectives, and verb conjugations of this term, such as "combusting" or "combusted." The method comprises combusting coal in a combustion chamber to produce at least one pollutant selected from the group consisting of a nitrogen-containing pollutant, sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride. Oil shale particles are introduced into the combustion chamber and are combusted to produce sorbent particulates and a reductant. The sorbent particulates and the reductant may be produced by pyrolyzing the oil shale particles at a temperature of greater than or equal to approximately 200° C. to devolatilize kerogen from the oil shale particles. The oil shale particles may be introduced into at least one of a superheater zone, a reheat zone, or an economizer zone of the combustion chamber. The at least one pollutant is contacted with at least one of the sorbent particulates and the reductant to decrease an amount of the at least one pollutant in the combustion chamber. The reductant may chemically reduce the at least one pollutant, such as reduce the nitrogen-containing pollutant to molecular nitrogen, water, and carbon dioxide. The sorbent particulates may be used to adsorb or absorb the at least one pollutant, such as adsorbing or absorbing at least one of sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride.

The present invention also relates to a combustion chamber for producing decreased pollutants in a combustion process. The combustion chamber comprises a burner zone that is configured to combust coal and to produce at least one pollutant selected from the group consisting of a nitrogen-containing pollutant, sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride. The burner zone is also configured to combust oil shale particles to produce sorbent particulates and a reductant, which are contacted with the at least one pollutant. The burner zone may be configured to contact the nitrogen-containing pollutant with the reductant to reduce the nitrogen-containing pollutant to molecular nitrogen, carbon dioxide, and water.

The combustion chamber also comprises at least one of a superheater zone and a reheat zone that are each configured to combust the oil shale particles to produce the sorbent particulates and the reductant. The superheater zone and the reheat zone are also each configured to contact the sorbent particulates and the reductant with the at least one pollutant. The combustion chamber also comprises at least one of an economizer zone, an air preheat zone, and a gas cleaning unit, which are each configured to contact the sorbent particulates and the reductant with the at least one pollutant. Each of the superheater zone, the reheat zone, and the economizer zone is configured to contact at least one of sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride with the sorbent particulates to adsorb or absorb at least one of these pollutants. Each of the air preheat zone and the gas cleaning unit is configured to contact at least one of the elemental mercury and mercuric chloride with the sorbent particulates to adsorb or absorb at least one of the elemental mercury and mercuric chloride.

In one embodiment, the combustion chamber is configured as a pulverized coal combustor.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawing in which:

DETAILED DESCRIPTION OF THE INVENTION

Figure 1:
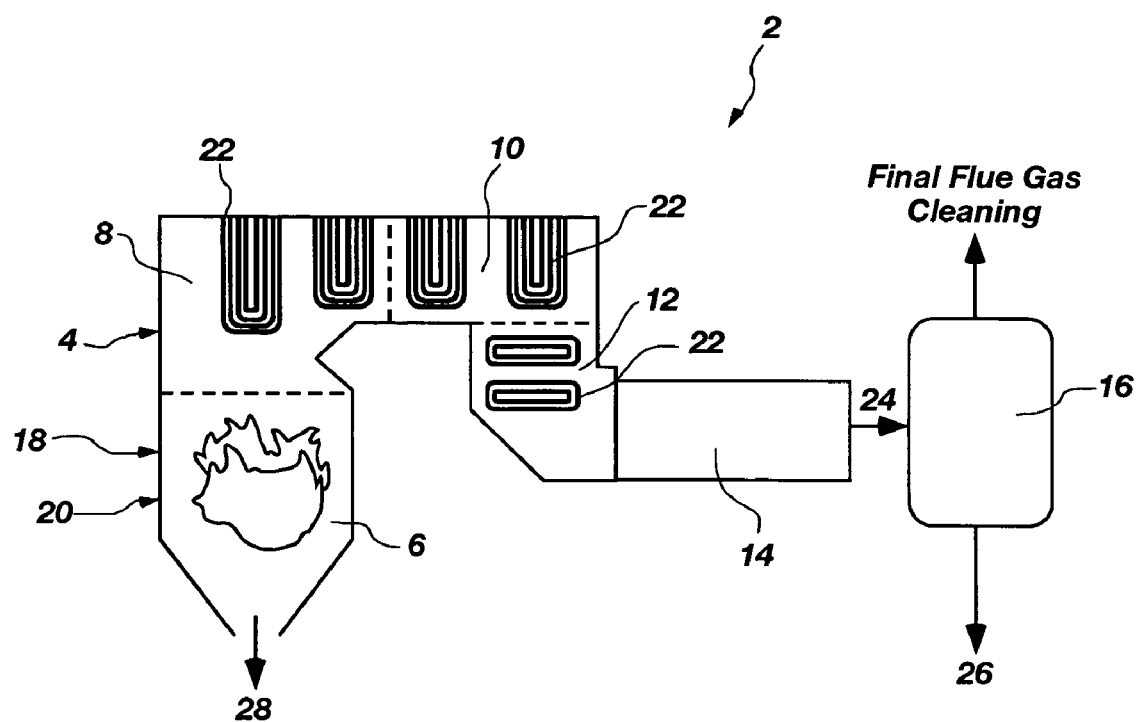
FIG. 1 is a schematic illustration of an embodiment of a pulverized coal combustor in which oil shale is used to decrease pollutant levels.

Oil shale is used to decrease or eliminate at least one pollutant that is produced during combustion of a primary fuel. The primary fuel may be coal, biomass, MSW, RDF, or mixtures thereof. During combustion of the primary fuel in a combustion chamber, the oil shale may function as a sorbent to decrease an amount of the pollutant(s) that is released from the combustion chamber. Alternatively, combustion of the oil shale may produce a reductant, which reduces the pollutant(s) to a more benign chemical species, decreasing the amount of the pollutant(s) that is released. By adjusting or controlling a temperature in the combustion chamber, the pollutant may be adsorbed or absorbed onto the oil shale or may be reduced by the reductant produced by the oil shale. The pollutant may be removed from the combustion chamber by contacting the pollutant with the oil shale for a sufficient amount of time for the oil shale to function as a sorbent or for the reductant to chemically reduce the pollutant. The amount of time sufficient to remove the pollutant is referred to herein as a residence time or a contact time.

The pollutant may be at least one of a nitrogen-containing pollutant, a sulfur-containing pollutant, an acid gas, and a metal. The nitrogen-containing pollutant may be NO, $NO_2$, $N_2O$, $N_2O_5$, or mixtures thereof. The sulfur-containing pollutant may be $SO_2$, $SO_3$, $H_2SO_4$, $H_2S$, COS, $CS_2$, or mixtures thereof. $SO_2$ may be the major sulfur-containing pollutant and $SO_3$ the minor sulfur-containing pollutant produced during combustion of primary fuels that contain sulfur. $H_2S$ may be the major sulfur-containing pollutant produced during gasification of sulfur-containing primary fuels. In one embodiment, the sulfur-containing pollutant is $H_2SO_4$, $SO_3$, $H_2S$, COS, $CS_2$, or mixtures thereof. The acid gas may be a halide-containing volatile gas, such as HCl, chlorine ("$Cl_2$"), hydroiodic acid ("HI"), iodine ("$I_2$"), hydrofluoric acid ("HF"), fluorine ("F"), hydrobrom ("HBr"), bromine ("Br"), or mixtures thereof. The acid gas may also be a phosphate-containing gas, such as $H_3PO_4$, phosphorus pentaoxide ("$P_2O_5$"), or mixtures thereof. The metal may be an elemental metal or a metal compound including, but not limited to, elemental mercury ("Hg°"), mercuric chloride ("$HgCl_2$"), mercury adsorbed on particulate matter, lead ("Pb") or compounds thereof, arsenic ("As") or compounds thereof, chromium ("Cr") or compounds thereof, or mixtures thereof. In one embodiment, the metal is elemental mercury or mercuric chloride. The oil shale may be used to remove a single pollutant or multiple pollutants from the combustion chamber. In one embodiment, the oil shale is used to remove nitrogen-containing pollutants, $H_2SO_4$, $SO_3$, $H_2S$, COS, $CS_2$, $SO_3$, elemental mercury, and mercuric chloride from the combustion chamber.

When the oil shale is heated in the combustion chamber, shale minerals, char particles, and kerogen are produced, as shown in Reaction 1:

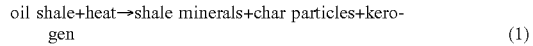

oil shale+heat→shale minerals+char particles+kerogen    (1)

A temperature of greater than or equal to approximately 200° C. may be used to pyrolyze the oil shale. As the oil shale is heated, the heat may cause the kerogen to depolymerize and devolatilize while the shale minerals may be calcined. The extent of depolymerization, devolatilization, pyrolysis, and char formation of the oil shale may vary depending on particle heat up rates, particle temperature, surrounding gas temperature, and an amount of time that the oil shale is heated. When the kerogen is devolatilized or released from the oil shale, a porous matrix of oxides, carbonates, or silicates may remain including, but not limited to, oxides, carbonates, or silicates of calcium ("Ca"), magnesium ("Mg"), sodium ("Na"), potassium ("K"), iron ("Fe"), or zinc ("Zn"). These oxides, carbonates, and silicates are collectively referred to herein as the shale minerals. For the sake of example only, the shale minerals may include, but are not limited to, calcium oxide, magnesium oxide, iron oxide, calcium carbonate, or mixtures thereof. The char particles or particles of residual carbon may also remain after the kerogen is devolatilized from the oil shale. The shale minerals and char particles are collectively referred to herein as sorbent particulates. The sorbent particulates are porous particles that have an increased surface area. As such, the sorbent particulates have an increased adsorption or absorption capability relative to that of the oil shale and may be used to adsorb or absorb mercury and other pollutants, as explained in detail below. Since the sorbent particulates are porous, the pollutants may readily diffuse into the sorbent particulates and react with the oxides, carbonates, and silicates therein.

The kerogen released from the oil shale may provide a source of the reductant used to reduce the nitrogen-containing pollutants. As shown in Reaction 2, the kerogen may be exposed to additional heat to crack or scission the kerogen, forming light and heavy hydrocarbons:

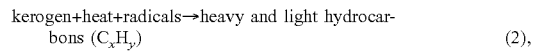

kerogen+heat+radicals→heavy and light hydrocarbons ($C_xH_y$)    (2), where x and y depend on the carbon and hydrogen ratio in the kerogen and temporal conditions. For instance, x may range from 1 to 25, such as from 1 to 3 for a light hydrocarbon, from 4 to 8 for an intermediate hydrocarbon, or from 9 to 25 for a heavy hydrocarbon. Y may range from 1 to 50 and is typically equal to two times "x" for a given hydrocarbon. A temperature of greater than or equal to approximately 350° C. may be used to crack and scission the polymeric kerogen. The heavy and light hydrocarbons may be used to reduce the nitrogen-containing pollutants to $N_2$, carbon dioxide ("$CO_2$"), and water ("$H_2O$") by heating the heavy and light hydrocarbons to a temperature of greater than or equal to approximately 400° C. according to the chemistries shown in Reactions 3 and 4:

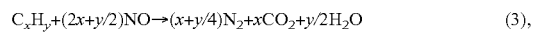

$C_xH_y+(2x+y/2)NO \rightarrow (x+y/4)N_2+xCO_2+y/2H_2O$    (3),

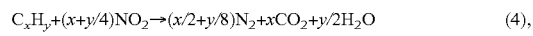

$C_xH_y+(x+y/4)NO_2 \rightarrow (x/2+y/8)N_2+xCO_2+y/2H_2O$    (4), where x is 1 or 2 and y is 1, 2, 3, or 4. Generally, Reactions 3 and 4 show the reduction of oxidized compounds of nitrogen to a reduced nitrogen compound, such as $N_2$.

The shale minerals or char particles may have an affinity for chemical bonding with mercury or mercury compounds (adsorption) and for physical bonding with mercury or mercury compounds (absorption). Therefore, the shale minerals or char particles produced by the pyrolysis of the oil shale (see Reaction 1) may be used to adsorb or absorb mercury or mercuric chloride according to the chemistries shown in Reactions 5, 6, 7, and 8:

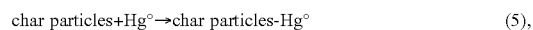

char particles+Hg°→char particles-Hg°    (5),

char particles+$HgCl_2$→char particles-$HgCl_2$    (6),

shale minerals+Hg°→M—Hg°    (7),

shale minerals+$HgCl_2$→M—$HgCl_2$    (8), where M is a metal or metal compound present in the oil shale that has affinity for mercury or mercuric chloride. M may be Fe, Zn, lead ("Pb"), silver ("Ag"), aluminum ("Al"), cadmium ("Cd"), chromium ("Cr"), nickel ("Ni"), titanium ("Ti"), selenium ("Se"), or arsenic ("As"). When the shale minerals or char particles come into contact with these pollutants for a sufficient residence time, the sorbent particulates may capture the elemental mercury or mercuric chloride. The adsorption or absorption of the elemental mercury or mercuric chloride by the shale minerals or char particles may also depend on a temperature at which the shale minerals or char particles contact the elemental mercury or mercuric chloride. The temperature may be maintained so that is it favorable for chemical or physical adsorption, such as at a temperature of less than or equal to approximately 200° C. This temperature may be achieved in a number of locations in the combustion chamber, such as in a process duct, in a particle cake collected by a gas cleaning unit, such as a baghouse or electrostatic precipitator ("ESP"), or in a packed-bed/gas reactor.

Carbonate or oxide compounds produced by the combustion of the oil shale may be used to remove sulfur-containing pollutants, such as $H_2SO_4$, $SO_3$, $SO_2$, $H_2S$, COS, $CS_2$, or mixtures thereof, according to the chemistries shown in Reactions 9-15:

$$M_x\text{---}(CO_3)_y + \text{heat} \rightarrow M_x\text{---}O_y + yCO_2 \quad (9),$$

$$CaCO_3 + SO_2 + \tfrac{1}{2}O_2 \rightarrow CaSO_4 + CO_2 \quad (10),$$

$$CaCO_3 + SO_3 \rightarrow CaSO_4 + CO_2 \quad (11),$$

$$CaCO_3 + H_2S \rightarrow CaS + H_2O + CO_2 \quad (12),$$

$$CaO + SO_2 + \tfrac{1}{2}O_2 \rightarrow CaSO_4 \quad (13),$$

$$CaO + SO_3 \rightarrow CaSO_4 \quad (14),$$

$$CaO + H_2S \rightarrow CaS + H_2O \quad (15),$$

where M is a metal, such as Ca, Mg, Na, K, Fe, or Zn, and where x and y vary depending on the metal carbonates present in the oil shale. For instance, x may be 1 or 2 and y may be 1, 2, or 3. While the reactions shown above are between $SO_2$, $SO_3$, or $H_2S$ and calcium carbonate or calcium oxide, similar reactions may occur between $SO_2$, $SO_3$, or $H_2S$ and carbonates or oxides of Mg, Na, K, Fe, or Zn and between $H_2SO_4$, COS, or $CS_2$ and carbonates or oxides of Ca, Mg, Na, K, Fe, or Zn. The shale minerals, such as the carbonate compounds, may be calcined by heating the oil shale to a temperature greater than or equal to approximately 450° C. The adsorption of the sulfur-containing pollutant may occur in a location of the combustion chamber where the temperature is relatively hot. The temperature may be sufficiently high to achieve favorable reaction of the sulfur-containing pollutant with the alkali compounds, alkaline-earth compounds, or other metal oxides present in the oil shale to produce sulfate or sulfide compounds. However, the temperature may be less than the dissociation temperatures of the compounds. To achieve reaction between the shale minerals and the $H_2SO_4$, $SO_2$, $SO_3$, $H_2S$, COS, or $CS_2$, a temperature ranging from greater than or equal to approximately 450° C. to less than approximately 1150° C. may be used.

The shale minerals, such as the carbonate or oxide compounds, may also be used to remove HCl and $Cl_2$ according to the chemistries shown in Reactions 16 and 17:

$$CaO + 2HCl \rightarrow CaCl_2 + H_2O \quad (16),$$

$$CaO + Cl_2 \rightarrow CaCl_2 + \tfrac{1}{2}O_2 \quad (17).$$

While the reactions shown above are between calcium oxide and chlorine-containing compounds, similar reactions may occur between HCl or $Cl_2$ and Mg, Na, K, Fe, or Zn. Similar reactions may also occur with iodine, iodine-containing compounds, fluorine, fluorine-containing compounds, bromine, and bromine-containing compounds. The adsorption of the HCl, $Cl_2$, HI, $I_2$, HF, F, HBr, or Br may occur in a location of the combustion chamber where the temperature is relatively hot. The temperature may be sufficiently high to achieve favorable reaction of the HCl, $Cl_2$, HI, $I_2$, HF, F, HBr, and Br with the alkali compounds, alkaline-earth compounds, or other metal oxides present in the oil shale to produce chloride compounds. However, the temperature may be less than the dissociation temperatures of the compounds. To react the HCl with the shale minerals, the temperature of the reaction may be maintained from greater than or equal to approximately 500° C. to less than approximately 1150° C.

The oil shale used in the combustion chamber may be ore that is obtained from a conventional oil shale mine and pulverized into particles. The oil shale may be obtained from mines in Utah, Colorado, or Wyoming that yield approximately 10 gallons of oil per ton of ore to approximately 80 gallons of oil per ton of ore. The oil shale may initially be ground or milled to a desired coarse particle size of less than or equal to approximately 5 cm (approximately 2 inches). The oil shale may be ground using conventional techniques, similar to the crushing and grinding techniques used in coal mining. The oil shale particles may be further pulverized into microsize particles having a particle size ranging from approximately 50 µm to approximately 150 µm, which are introduced into the combustion chamber. The microsize particles may be pulverized, classified, and entrained in an air stream using conventional techniques, similar to the techniques for pulverizing, classifying, and entraining coal in an air stream. As such, existing coal pulverizers, classifiers, and injectors may be used to produce and inject the oil shale particles into the combustion chamber. The oil shale particles may be unreacted, in that the oil shale particles have not been pyrolyzed or devolatilized. However, oil shale retort (devolatilized oil shale particles) may also be used in the combustion chamber.

To decrease the amount of the pollutants produced by combustion of the primary fuel, the oil shale particles may be introduced into the combustion chamber, which may be a pulverized coal combustor ("PCC"), a furnace, a boiler, fluidized bed combustor or gasifier, a circulating bed combustor or gasifier, a staged reactor combustor or gasifier, an entrained-flow combustor or gasifier, an offgas duct, an offgas cleanup transport reactor, or a cement kiln. The oil shale particles may also be used in a metallurgical process, such as during the production of iron ore. The combustion chamber may be configured to combust coal or other fossil fuels, biomass, MSW, or RDF. While the embodiments herein describe using the oil shale particles in the PCC, the oil shale particles may be used in other types of combustion chambers as long as the combustion chamber is capable of producing the temperatures at which the reactions with the oil shale particles occur. In addition, while the embodiments herein describe using coal as the primary fuel, other fuels, such as biomass, MSW, or RDF, may be used.

PCCs are designed to burn coal as the primary fuel and to convert the chemical energy (enthalpy) of the burning coal into heat, which is transferred to steam tubes to produce super-heated, high pressure steam. The PCC may produce from approximately 200 $MW_e$ to approximately 1000 $MW_e$ of energy. The PCC may be a long, vertical burner box that is lined with the steam tubes or has pendant arrangements of the steam tubes. PCCs are known in the art and, therefore, are not discussed in detail herein. A schematic illustration of a PCC 2 into which the oil shale particles 4 may be introduced is shown in FIG. 1. The PCC 2 includes a burner zone 6, a superheater zone 8, a reheat zone 10, an economizer zone 12, an air preheat zone 14, and a gas cleaning unit 16. To decrease the pollutants produced by combusting the coal in the PCC 2, the temperature in each of these zones may be controlled to achieve the desired reactions between the pollutants and the kerogen and between the pollutants and the sorbent particulates.

Pulverized coal 18 may be introduced into the burner zone 6 of the PCC 2 and combusted with air 20. An amount of pulverized coal 18 added to the PCC 2 may depend on an efficiency of the PCC 2 and its desired power output. A feed rate at which the pulverized coal 18 is introduced into the PCC 2 may be calculated based on the efficiency of the PCC 2 and desired power output, as known in the art. The pulverized coal 18 may be entrained with the air 20 and injected into the PCC 2 through multiple burners (not shown), which are also referred to in the art as burner registers or burner boxes. Alternatively, the pulverized coal 18 may be injected into the burner zone 6 through primary ports (not shown). The air 20 may be injected with the pulverized coal 18 or may be injected through secondary or tertiary ports (not shown). To combust the pulverized coal 18, the burner zone 6 may be maintained at a temperature ranging from approximately 1085° C. to approximately 1625° C. (approximately 2000° F. to approximately 3000° F.) Upon combustion, nitrogen that is present in the pulverized coal 18 and the air 20 may be converted to the nitrogen-containing pollutants. Sulfur in the pulverized coal 18, such as organically-bound sulfur or inorganic or pyrite-phase sulfur, may be released and oxidized to the sulfur-containing pollutants, such as $H_2SO_4$, $SO_2$, $SO_3$, $H_2S$, COS, $CS_2$, or mixtures thereof. Chlorine in the pulverized coal 18 may be converted to HCl, $Cl_2$, or other volatile chlorine compounds. Iodine in the pulverized coal 18 may be converted to HI, $I_2$, or other volatile iodine compounds while fluorine in the pulverized coal 18 may be converted to HF, F, or other volatile fluoride compounds. Bromine in the pulverized coal 18 may be converted to HBr, Br, or other volatile bromide compounds. Mercury present in the pulverized coal 18 may be released as $Hg°$ or $HgCl_2$.

The oil shale particles 4 may be entrained and injected into the PCC 2 in at least one of the burner zone 6, the superheater zone 8, and the reheat zone 10, depending on the temperature profile of the PCC 2 and the properties of the oil shale. For the sake of clarity and simplicity, the oil shale particles 4 are shown in FIG. 1 as being injected into the superheater zone 8. The oil shale particles 4 may be injected into the PCC 2 through multiple burners (not shown), primary ports (not shown), or secondary or tertiary ports (not shown). The oil shale particles 4 are not injected into a zone of the PCC 2 where the oil shale particles 4 would fuse and slag since this may affect the ability of the oil shale particles 4 to capture the pollutant in later stages of the gas exit path. A feed rate at which the oil shale particles 4 are introduced into the PCC 2 may depend on the efficiency of the sorbent reactions. This feed rate may be determined as known in the art. In one embodiment, the oil shale particles 4 are injected into an upper region of the burner zone 6 or a lower region of the superheater zone 8. Oil shale retort (devolatilized oil shale particles) may also be injected into the reheat zone 10. After being injected into the PCC 2, the oil shale particles 4 may begin to devolatilize and release the kerogen, which reacts with the nitrogen-containing pollutant as described in Reactions 1-4. The temperature in at least one of the burner zone 6, the superheater zone 8, and the reheat zone 10 may be maintained so that it is favorable to chemical reduction of the nitrogen-containing pollutants to $N_2$, $CO_2$, and $H_2O$, significantly decreasing the amount of the nitrogen-containing pollutants that exit the PCC 2.

The shale minerals produced after the kerogen is released may react with gaseous $H_2SO_4$, $SO_3$, $SO_2$, HCl, $H_2S$, COS, $CS_2$, or mixtures thereof as described in Reactions 9-17. Calcium oxide, magnesium oxide, iron oxide, and other metal oxides from the oil shale may react and capture the $H_2SO_4$, $SO_3$, $SO_2$, HCl, $H_2S$, COS, $CS_2$, or mixtures thereof when the reaction kinetics and thermodynamics are favorable for the formation of $CaSO_4$ or CaS. Generally, favorable reactions may occur at a temperature ranging from approximately 451° C. to approximately 1125° C. Temperatures within this range may occur in at least one of the superheater zone 8, the reheat zone 10, and the economizer zone 12. Therefore, the capture of the HCl, $H_2SO_4$, $SO_3$, $SO_2$, $H_2S$, COS, $CS_2$, or mixtures thereof may occur as the oil shale particles 4 pass out of the superheater zone 8 and into the reheat zone 10 and the economizer zone 12. The capture of the HCl, $H_2SO_4$, $SO_3$, $SO_2$, $H_2S$, COS, $CS_2$, or mixtures thereof may also continue into a lower portion of the air preheat zone 14. A residence time or contact time between the shale minerals and the pollutants may be greater than or equal to approximately 5 seconds to capture these pollutants.

The mercury or mercuric chloride may react with the shale minerals or char particles by two mechanisms: physical absorption or chemical adsorption. As the shale minerals or char particles pass into portions of the PCC 2 having cooler temperatures, the mercury or mercuric chloride may be adsorbed or absorbed, as described in Reactions 5-8. For instance, the mercury or mercuric chloride may be adsorbed or absorbed by the sorbent particulates in the air preheat zone 14 or the gas cleaning unit 16. These reactions may occur when the temperature drops below approximately 200° C. (approximately 392° F.). Since temperatures within this range may occur in the air preheat zone 14 or the gas cleaning unit 16, these portions of the PCC 2 may be the most effective in removing the mercury or mercuric chloride. To effectively capture these pollutants, the contact time between the sorbent particulates and the mercury or mercuric chloride may be greater than approximately 30 seconds. Such long contact times may be achieved in the gas cleaning unit 16.

The hot gases and entrained flyash particles produced by combusting the pulverized coal 18 may exit the burner zone 6 and pass into the superheater zone 8, where the hot gases contact the steam tubes 22. The steam tubes 22 extract heat from the hot gases and increase the steam temperature. In the superheater zone 8, the temperature of the hot gases ranges from approximately 975° C. to approximately 1320° C. (from approximately 1800° F. to approximately 2400° F.). The hot gases and entrained flyash particles may pass into the reheat zone 10, which is a transition zone between the superheater zone 8 and the economizer zone 12. Steam tubes 22 may also be present in the reheat zone 10. The temperature in the reheat zone 10 may vary from approximately 650° C. to approximately 980° C. (from approximately 1200° F. to approximately 1800° F.). The hot gases may be cooled in the economizer zone 12 by additional steam tubes 22. The temperature of the hot gases in the economizer zone 12 may range from approximately 535° C. to approximately 650° C. (from approximately 1000° F. to approximately 1200° F.).

The gases that exit the economizer zone 12 are referred to in the art as flue gas. At this point, the flue gas may include air, combustion products, such as water vapor, carbon dioxide, mercury, and particulate matter. The flue gas may be substantially free of the nitrogen-containing pollutants, the sulfur-containing pollutants, and the HCl because these pollutants are removed in the burner zone 6, the superheater zone 8, or the reheat zone 10. The flue gas may be further cooled by gas-to-gas heat exchangers (not shown) in the air preheat zone 14 to preheat the incoming combustion air. The temperature of the flue gas in the air preheat zone 14 may range from approximately 120° C. to approximately 230° C. (from approximately 250° F. to approximately 450° F.). The flue gas 24 may flow into the gas cleaning unit 16, such as the baghouse or ESP, to remove the particulate matter, such as the flyash 26. The flyash 26 may be collected on a filter in the gas cleaning unit 16.

Since introducing the oil shale particles 4 into the PCC 2 utilizes many existing coal handling and processing technologies, this method of decreasing levels of pollutants in the flue gas 24 may be readily implemented in existing PCCs because it does not require the installation of new equipment. The use of the oil shale particles 4 may also be incorporated into future PCC designs without significant costs.

As described above, the oil shale particles 4 may be used to decrease the amount of a single type of pollutant, such as a nitrogen-containing pollutant, $H_2SO_4$, $SO_3$, $SO_2$, $H_2S$, COS, $CS_2$, mercury, or mercury chloride, in the flue gas 24. The oil shale particles 4 may also be used to decrease the amount of different types of pollutants in the flue gas 24. Therefore, the oil shale particles 4 may provide multi-pollutant control. In addition, since pyrolization of the oil shale particles 4 produces porous sorbent particulates, higher pollutant loadings may be achieved. As such, lower injection rates of the oil shale particles 4 may be used, which decreases the amount of solid material for disposal. While the oil shale particles 4 effectively decrease the pollutant levels in the flue gas 24, the oil shale particles 4 may also be used in combination with other technologies to further decrease the amounts of the pollutants, such as the LIMB, LIDS, SNCR, and $NO_x$ reburning technologies.

In addition to removing the pollutants, the oil shale particles 4 may add enthalpy (i.e., heating value) since the oil shale particles 4 are combusted along with the primary fuel. The char particles and the heavy and light hydrocarbons, which are produced during the combustion of the oil shale, may be fully or partially combusted to provide additional heat, as shown by Reactions 18-25:

$$C_xH_y+(x+y/4)O_2 \rightarrow xCO_2+y/2H_2O \qquad (18),$$

$$CO+\tfrac{1}{2}O_2 \rightarrow CO_2 \qquad (19),$$

$$C_xH_y+x/2O_2 \rightarrow xCO+y/2H_2 \qquad (20),$$

$$C_xH_y+xH_2O \rightarrow xCO+(x+y/2)H_2 \qquad (21),$$

$$\text{Char carbon}+O_2 \rightarrow CO_2 \qquad (22),$$

$$\text{Char carbon}+\tfrac{1}{2}O_2 \rightarrow CO \qquad (23),$$

$$\text{Char carbon}+CO_2 \rightarrow 2CO \qquad (24),$$

$$\text{Char carbon}+H_2O \rightarrow CO+H_2 \qquad (25).$$

Reactions 18-20 may occur at a temperature greater than or equal to approximately 200° C. and reactions 19-25 may occur at a temperature greater than or equal to approximately 400° C. While not all of Reactions 18-25 are exothermic, the reactions either produce heat or produce reactive gases that may be used to produce heat. The oil shale may provide a net positive heat of combustion that ranges from approximately 4.7 MJ/kg (or approximately 2,000 BTU/lb) to approximately 9.3 MJ/kg (or approximately 4,000 BTU/lb). The energy provided by the combustion of the oil shale may offset the heat lost due to the pollutant sorption reactions.

The unreacted heavy and light hydrocarbons may be substantially completely reacted in the superheater zone 8 or the reheat zone 10 with excess oxygen (not shown) that is introduced. In addition, supplementary oxygen (not shown) may be added to the superheater zone 8 or the reheat zone 10 as needed to combust the heavy and light hydrocarbons. Most combustion chambers are equipped with soot blowing air injectors or air lances, which may be used to adjust the oxygen concentration to achieve complete combustion of the heavy and light hydrocarbons.

Using the oil shale particles 4 in the combustion process may also improve the disposal of flyash produced during the combustion of the primary fuel. The combustion of the oil shale may also produce flyash 26 and slag 28 (coal and oil shale byproduct mineral matter). The oil shale particles 4 may be used to make the flyash 26 or the slag 28 suitable for disposal in a landfill. During combustion, the oil shale particles 4 are calcined and converted to a pozzolanic material that includes oxide compounds. The pozzolanic material may encapsulate and immobilize the metals, slag 28, and flyash 26 produced during the combustion. The flyash 26 may also be used as a road bed material or a construction material.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of decreasing pollutants produced in a combustion process, comprising:

introducing oil shale particles into a combustion chamber in the presence of at least one pollutant selected from the group consisting of a nitrogen-containing pollutant, sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride;

combusting the oil shale particles to produce sorbent particulates and a reductant;

exposing the at least one pollutant to at least one of the sorbent particulates and the reductant at a temperature ranging from greater than or equal to approximately 450° C. to less than approximately 1150° C.; and exposing the sorbent particulates to at least one of the mercury and mercuric chloride at a temperature of less than or equal to approximately 200° C.

2. The method of claim 1, wherein introducing the oil shale particles into the combustion chamber comprises introducing the oil shale particles into at least one of a superheater zone, a reheat zone, and an economizer zone of the combustion chamber.

3. The method of claim 1, wherein combusting the oil shale particles to produce the sorbent particulates and the reductant comprises pyrolyzing the oil shale particles at a temperature of greater than or equal to approximately 200° C. to devolatilize kerogen from the oil shale particles.

4. The method of claim 1, wherein exposing the at least one pollutant to at least one of the sorbent particulates and the reductant comprises reducing the at least one pollutant with the reductant.

5. The method of claim 1, wherein exposing the at least one pollutant to at least one of the sorbent particulates and the reductant comprises reducing the nitrogen-containing pollutant to molecular nitrogen, carbon dioxide, and water.

6. The method of claim 1, wherein combusting the oil shale particles to produce the sorbent particulates and the reductant comprises producing shale minerals, char particles, and kerogen.

7. The method of claim 1, wherein exposing the at least one pollutant to at least one of the sorbent particulates and the reductant at a temperature ranging from greater than or equal to approximately 450° C. to less than approximately 1150° C. comprises adsorbing or absorbing the at least one pollutant onto the sorbent particulates.

8. The method of claim 1, wherein exposing the at least one pollutant to at least one of the sorbent particulates and the reductant at a temperature ranging from greater than or equal to approximately 450° C. to less than approximately 1150° C. comprises adsorbing or absorbing at least one of sulfuric acid, sulfur trioxide, carbonyl sulfide, carbon disulfide, chlorine, hydroiodic acid, iodine, hydrofluoric acid, fluorine, hydrobromic acid, bromine, phosphoric acid, and phosphorous pentaoxide onto the sorbent particulates.

9. The method of claim 1, further comprising combusting a primary fuel with the oil shale particles.

10. The method of claim 1, wherein exposing the at least one pollutant to at least one of the sorbent particulates and the reductant at a temperature ranging from greater than or equal to approximately 450° C. to less than approximately 1150° C. comprises reacting at least one of sulfuric acid, sulfur trioxide, carbonyl sulfide, carbon disulfide, chlorine, hydroiodic acid, iodine, hydrofluoric acid, fluorine, hydrobromic acid, bromine, phosphoric acid, and phosphorous pentaoxide with the sorbent particulates.

11. A method of controlling pollutants, comprising:
convening oil shale to sorbent particulates and kerogen in a combustion chamber;
heating the kerogen to form a reductant;
exposing the reductant to at least one nitrogen-containing pollutant at a first temperature in the combustion chamber; and
exposing the sorbent particles to at least one pollutant selected from the group consisting of sulfuric acid, sulfur trioxide, carbonyl sulfide, carbon disulfide, chlorine, hydroiodic acid, iodine, hydrofluoric acid, fluorine, hydrobromic acid, bromine, phosphoric acid, phosphorous pentaoxide, elemental mercury, and mercuric chloride at a second temperature in the combustion chamber.

12. The method of claim 11, further comprising combusting a primary fuel at a temperature in a range of from about 1096° C. to about 1625° C. to produce the nitrogen-containing pollutant and the at least one pollutant.

13. The method of claim 11, wherein converting oil shale to sorbent particulates and kerogen comprises combusting the oil shale at a temperature of greater than or equal to approximately 200° C.

14. The method of claim 11, wherein heating the kerogen to form a reductant comprises exposing the kerogen to a temperature of greater than or equal to approximately 350° C.

15. The method of claim 11, wherein exposing the reductant to at least one nitrogen-containing pollutant at a first temperature in the combustion chamber comprises reacting the at least one nitrogen-containing pollutant and the reductant at a temperature of greater than or equal to approximately 400° C. to produce nitrogen gas.

16. The method of claim 11, wherein exposing the sorbent particles to at least one pollutant comprises calcinating the sorbent particles at a temperature of from approximately 450° C. to approximately 1150° C. in the presence of at least one of sulfuric acid, sulfur trioxide, carbonyl sulfide, carbon disulfide, chlorine, hydroiodic acid, iodine, hydrofluoric acid, fluorine, hydrobromic acid, bromine, phosphoric acid, and phosphorous pentaoxide.

17. The method of claim 11, wherein exposing the sorbent particles to at least one pollutant at a second temperature in the combustion chamber comprises reacting the sorbent particles with at least one of elemental mercury and mercuric chloride at a temperature of less than approximately 200° C.

* * * * *

UNITED STATES PATENT AND TRADEMARK OFFICE
CERTIFICATE OF CORRECTION

PATENT NO. : 7,384,615 B2 Page 1 of 1
APPLICATION NO. : 11/004698
DATED : June 10, 2008
INVENTOR(S) : Richard D. Boardman and Robert A. Carrington It is certified that error appears in the above-identified patent and that said Letters Patent is hereby corrected as shown below:

On the title page:
In ITEM 54 after "METHOD" insert --FOR--

In the specification:
COLUMN 1, LINE 1, after "METHOD" insert --FOR--

In the claims:
CLAIM 11, COLUMN 13, LINE 42, please change "convening" to --converting--

Signed and Sealed this

Eighth Day of September, 2009

David J. Kappos
*Director of the United States Patent and Trademark Office*